(12) United States Patent
Zhou et al.

(10) Patent No.: US 12,653,088 B2
(45) Date of Patent: Jun. 16, 2026

(54) MACHINE LEARNING BASED CONTROL AND RE-ROUTING

(71) Applicant: AGCO International GmbH, Neuhausen (CH)

(72) Inventors: Kun Zhou, Randers (DK); René Søndergaard Nilsson, Randers (DK); Kenneth Guldbrandt Lausdahl, Randers (DK); Søren Ludvig Bech, Randers (DK); Jens Nørgaard Lund, Randers (DK)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 18/775,634

(22) Filed: Jul. 17, 2024

(65) Prior Publication Data

US 2025/0113758 A1 Apr. 10, 2025

Related U.S. Application Data

(60) Provisional application No. 63/588,218, filed on Oct. 5, 2023.

(51) Int. Cl.
*A01B 69/00* (2006.01)
*A01B 69/04* (2006.01)
(Continued)

(52) U.S. Cl.
CPC ............. *A01B 69/008* (2013.01); *G05D 1/43* (2024.01); *G05D 1/644* (2024.01); *G06Q 50/02* (2013.01)

(58) Field of Classification Search
CPC ........ A01B 69/008; G05D 1/644; G05D 1/43; G06Q 50/02
(Continued)

(56) References Cited

U.S. PATENT DOCUMENTS

| | | | |
|---|---|---|---|
| 11,690,320 B2 | 7/2023 | Anderson | |
| 2006/0178823 A1* | 8/2006 | Eglington | ............ A01B 69/007 701/414 |

(Continued)

FOREIGN PATENT DOCUMENTS

| | | | |
|---|---|---|---|
| CN | 108738444 B | 10/2021 | |
| WO | WO-2013178779 A1* | 12/2013 | ............. B63B 49/00 |
| WO | 2017106478 A1 | 6/2017 | |

OTHER PUBLICATIONS

UK Intellectual Property Office, Search Report for related UK Application No. GB2319516.7, dated May 31, 2024, 3 pages.
(Continued)

*Primary Examiner* — Mahmoud S Ismail

(57) ABSTRACT

Embodiments include technologies that use machine learning to update a route plan to re-route a mobile machine in a field. In some examples, a method includes using a mobile machine to perform work in a field and recording travelled path information. The recorded path information includes information about one or more paths followed by the machine when performing the work in the field. The method also includes using one or more computing devices on the machine to input the path information into a trained deep learning model and to receive new machine travel paths from the trained model. Also, the method includes using the computing device(s) on the mobile machine to control the machine to follow the new travel paths generated by the trained model.

18 Claims, 11 Drawing Sheets

(51) Int. Cl.
*G05D 1/43* (2024.01)
*G05D 1/644* (2024.01)
*G06Q 50/02* (2012.01)

(58) Field of Classification Search
USPC .......................................................... 701/50
See application file for complete search history.

(56) References Cited

U.S. PATENT DOCUMENTS

| | | | |
|---|---|---|---|
| 2018/0169856 A1* | 6/2018 | Murakami ............... | B25J 9/163 |
| 2018/0257657 A1 | 9/2018 | Blank et al. | |
| 2018/0271015 A1 | 9/2018 | Redden et al. | |
| 2021/0029877 A1 | 2/2021 | Vandike et al. | |
| 2021/0223056 A1 | 7/2021 | Zhang | |
| 2022/0237522 A1* | 7/2022 | Kalcher ................. | G06N 3/045 |
| 2023/0094319 A1 | 3/2023 | Hansen | |
| 2023/0101136 A1 | 3/2023 | Hansen | |
| 2023/0107444 A1 | 4/2023 | Anderson et al. | |
| 2023/0205219 A1 | 6/2023 | Towal et al. | |
| 2023/0232731 A1 | 7/2023 | Johnson | |
| 2023/0234559 A1 | 7/2023 | Potter et al. | |
| 2023/0242095 A1 | 8/2023 | Johnson | |
| 2023/0297093 A1* | 9/2023 | Keerthisinghe .... | G05B 23/0221 |
| | | | 700/291 |
| 2023/0342708 A1 | 10/2023 | Coughran et al. | |
| 2024/0370019 A1* | 11/2024 | Shonk .................. | A01B 69/008 |
| 2024/0378872 A1* | 11/2024 | Ach ..................... | G06V 10/803 |

OTHER PUBLICATIONS

Tormagov Timofey et al: "Coverage Path Planning for 3D Terrain with Constraints on Trajectory Curvature Based on Second-Order Cone Programming", Advances in Optimization and Applications: 12th International Conference, vol. 1514, DOI: 10.1007/978-3-030-92711-018, Oct. 1, 2021, 15 Pages.

"Dong Liang et al: "Continuous curvature wayline generation using quadratic optimisation for agricultural machine guidance", Biosystems Engineering, Elsevier, vol. 238, Jan. 5, 2024, DOI: 10.1016/J.BIOSYSTEMSENG.2023.12.009, Jan. 5, 2024, 16 Pages.".

European Patent Office, Search Report for related EP Application No. EP24187152, dated Dec. 4, 2024, 13 pages.

* cited by examiner

300

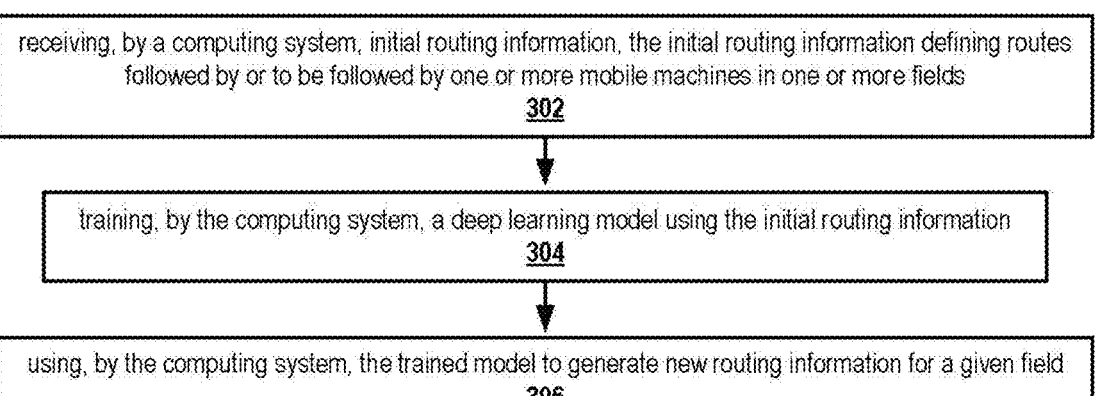

receiving, by a computing system, initial routing information, the initial routing information defining routes followed by or to be followed by one or more mobile machines in one or more fields
302 training, by the computing system, a deep learning model using the initial routing information
304 using, by the computing system, the trained model to generate new routing information for a given field
306

FIG. 3

400 using a mobile machine to perform work in a field and recording travelled path information, the path information including information about path(s) followed by the mobile machine when performing the work in the field
402 using computing device(s) on the mobile machine to input the path information into a deep learning mode (such as the trained model of method 300) and to receive new machine travel paths from the deep learning model
404 using the computing device(s) on the mobile machine to control the machine to follow the new machine travel paths generated by the deep learning model
406

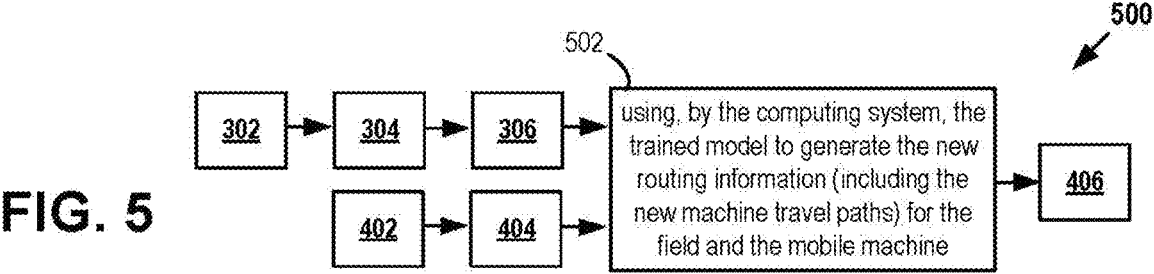

| 302 | → | 304 | → | 306 | → |
| --- | --- | --- | --- | --- | --- | using, by the computing system, the trained model to generate the new routing information (including the new machine travel paths) for the field and the mobile machine

| 402 | → | 404 | → |

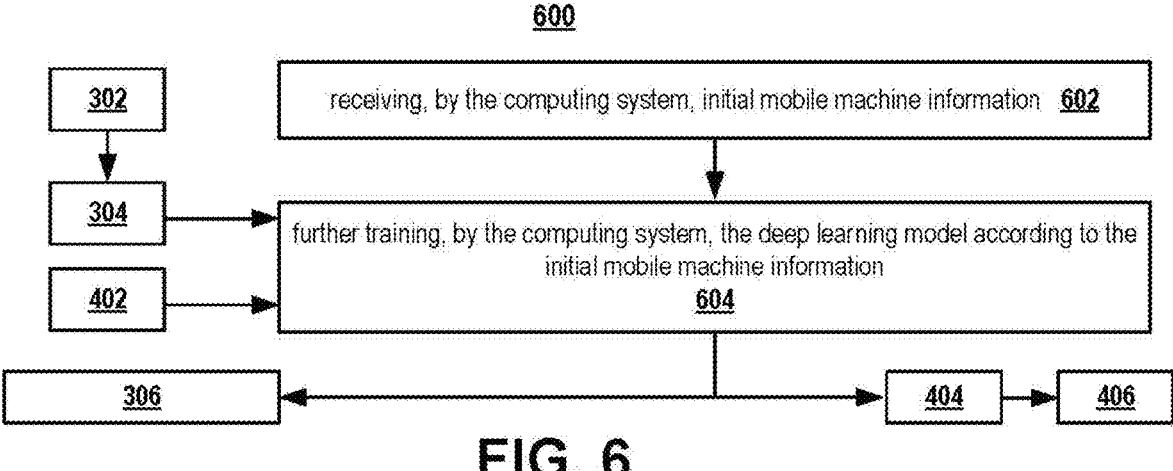

302 receiving, by the computing system, initial mobile machine information    602

304

402 further training, by the computing system, the deep learning model according to the initial mobile machine information
604

302 receiving, by the computing system, initial field information
702

304

402 further training, by the computing system, the deep learning mode according to the initial field information
704

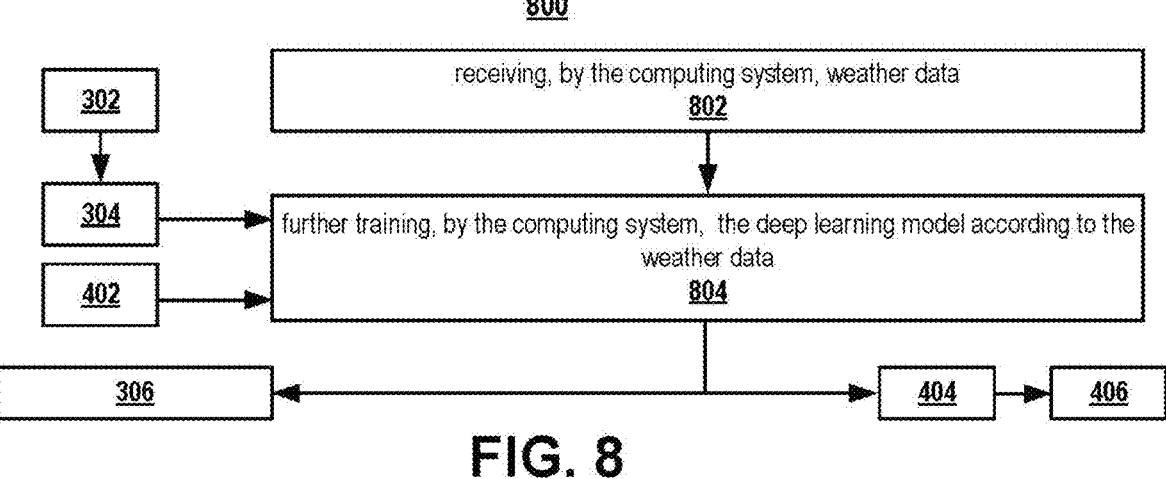

302 receiving, by the computing system, weather data
802

304

402 further training, by the computing system, the deep learning model according to the weather data
804

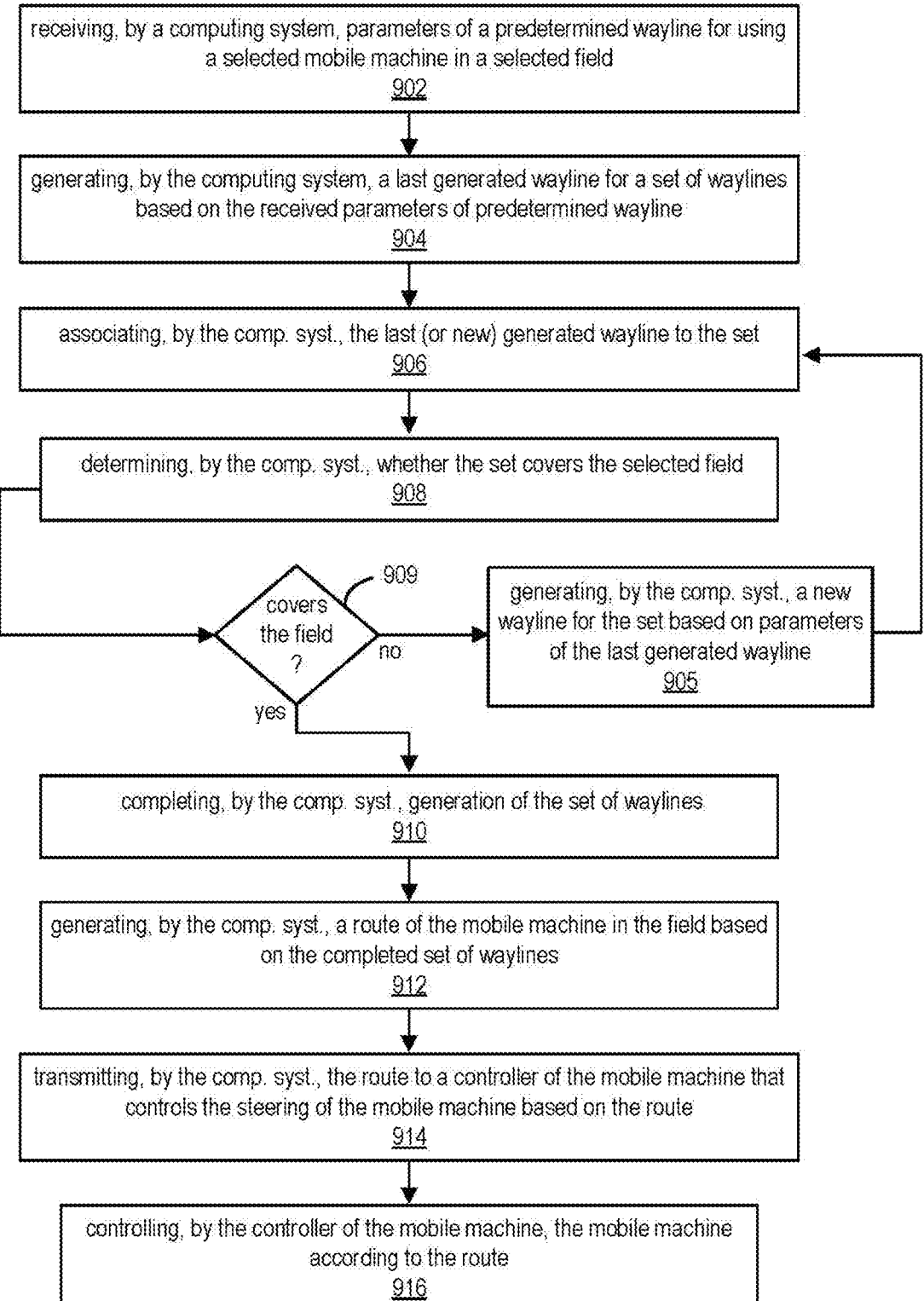

900 receiving, by a computing system, parameters of a predetermined wayline for using a selected mobile machine in a selected field
902 generating, by the computing system, a last generated wayline for a set of waylines based on the received parameters of predetermined wayline
904 associating, by the comp. syst., the last (or new) generated wayline to the set
906 determining, by the comp. syst., whether the set covers the selected field
908

909 covers the field ?

no generating, by the comp. syst., a new wayline for the set based on parameters of the last generated wayline
905 yes completing, by the comp. syst., generation of the set of waylines
910 generating, by the comp. syst., a route of the mobile machine in the field based on the completed set of waylines
912 transmitting, by the comp. syst., the route to a controller of the mobile machine that controls the steering of the mobile machine based on the route
914 controlling, by the controller of the mobile machine, the mobile machine according to the route
916

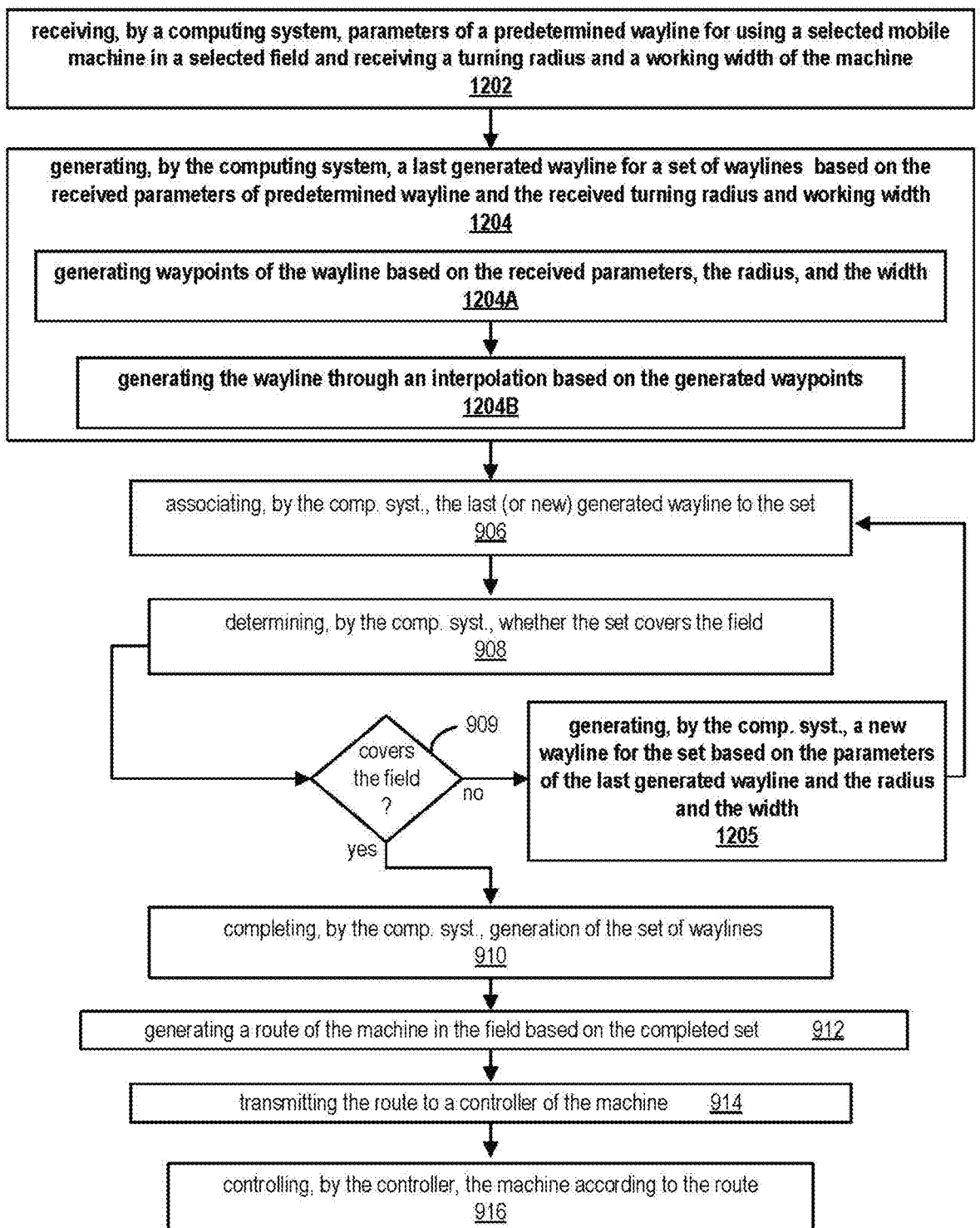

receiving, by a computing system, parameters of a predetermined wayline for using a selected mobile machine in a selected field and receiving a turning radius and a working width of the machine
1202 generating, by the computing system, a last generated wayline for a set of waylines based on the received parameters of predetermined wayline and the received turning radius and working width
1204 generating waypoints of the wayline based on the received parameters, the radius, and the width
1204A generating the wayline through an interpolation based on the generated waypoints
1204B associating, by the comp. syst., the last (or new) generated wayline to the set
906 determining, by the comp. syst., whether the set covers the field
908

909 covers the field ?

no generating, by the comp. syst., a new wayline for the set based on the parameters of the last generated wayline and the radius and the width
1205 yes completing, by the comp. syst., generation of the set of waylines
910 generating a route of the machine in the field based on the completed set          912 transmitting the route to a controller of the machine          914 controlling, by the controller, the machine according to the route
916

FIG. 12

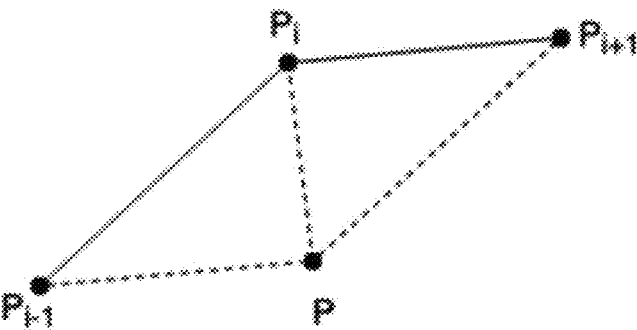
FIG. 13A
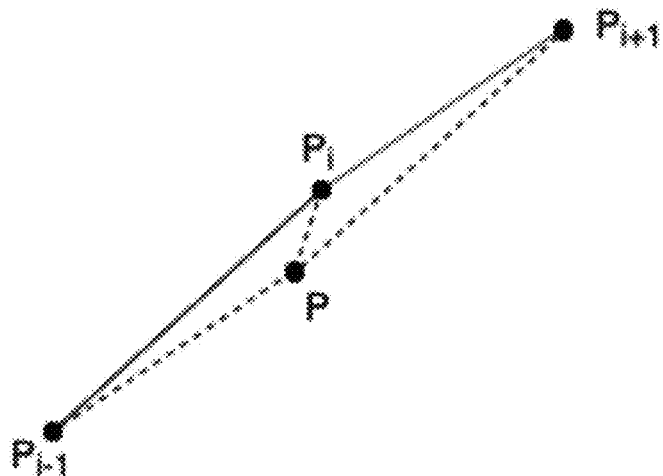
FIG. 13B
FIG. 14
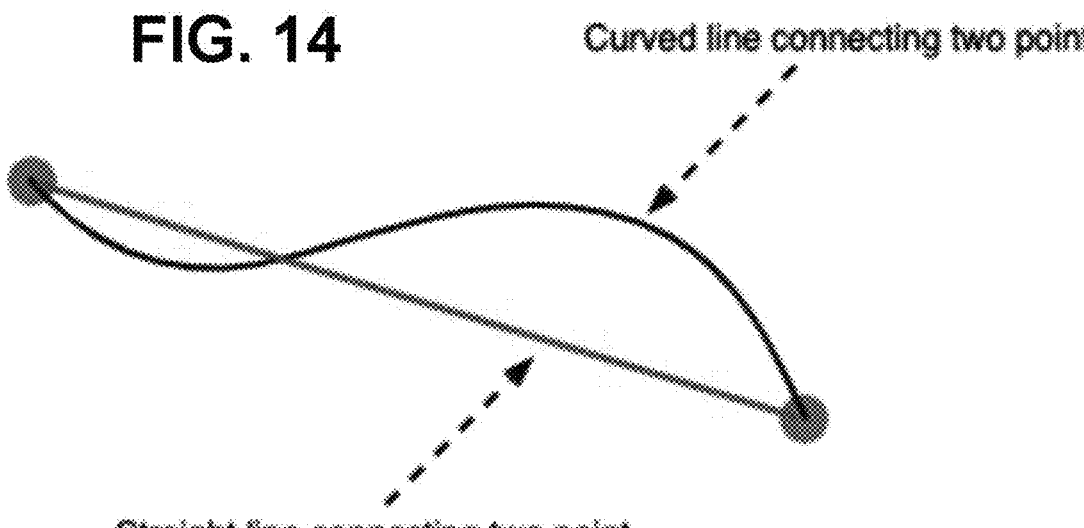
Curved line connecting two point
Straight line connecting two point

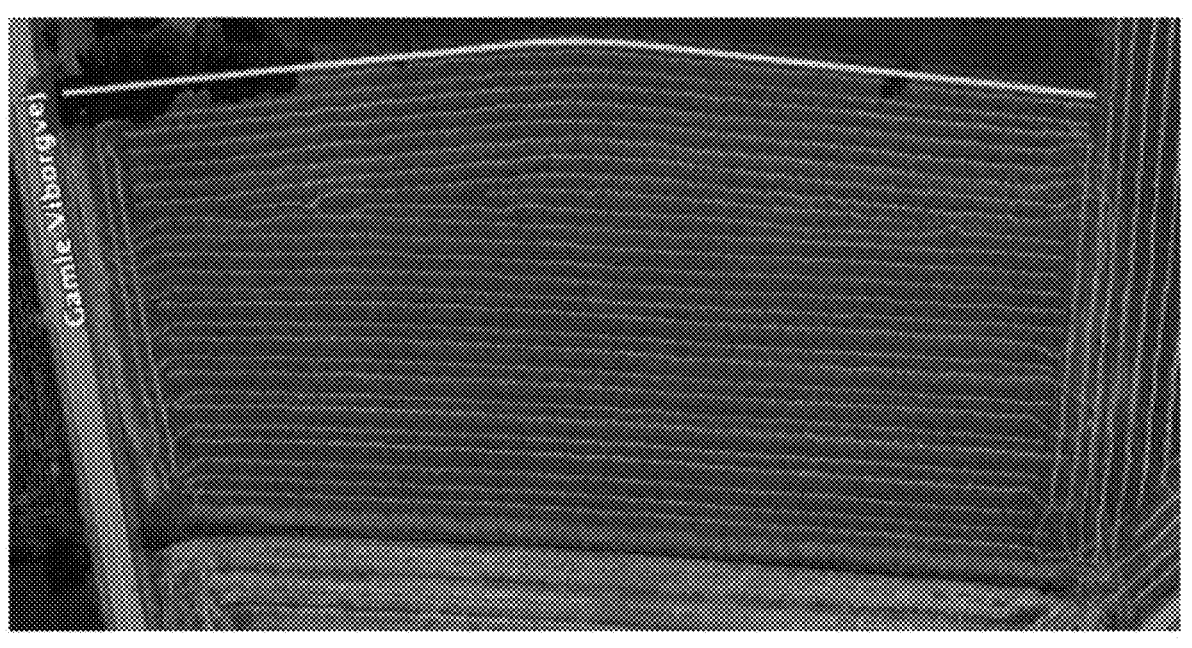
FIG. 17A
FIG. 17B
User preference
shorter wayline ━━━━━━━●━━━━━━━━ Less skipped area
FIG. 18

1900 using computing device(s) on a mobile machine to input travelled path information and real-time field attributes into a trained model (such as the trained model of method 300 or 400) and to receive new machine travel paths from the trained model (wherein the real-time field attributes are sensed by the mobile machine, or by nearby sensors in the field, or by remote sensors capturing field attributes near the machine)

1902

using, by the computing system, the trained model to generate the new machine travel paths according to the travelled path information and the real-time field attributes
1904

using the computing device(s) on the mobile machine to control the machine to follow the new machine travel paths generated by the trained model
1906

FIG. 19

2000 using computing device(s) on a mobile machine to input travelled path information and real-time machine attributes into a trained model (such as the trained model of method 300 or 400) and to receive new machine travel paths from the trained model (wherein the real-time machine attributes are measure or sensed by the mobile machine, or by nearby sensors in the field, or by remote sensors capturing attributes of the machine)

2002

using, by the computing system, the trained model to generate the new machine travel paths according to the travelled path information and the real-time machine attributes
2004

using the computing device(s) on the mobile machine to control the machine to follow the new machine travel paths generated by the trained model
2006

FIG. 20

MACHINE LEARNING BASED CONTROL AND RE-ROUTING

CROSS-REFERENCE TO RELATED APPLICATIONS

This application claims the benefit of the filing date of U.S. Provisional Patent Application Ser. No. 63/588,218, filed Oct. 5, 2023, the disclosure of which is hereby incorporated herein in its entirety by this reference.

TECHNICAL FIELD

The present disclosure relates to methods and systems using machine learning to control and re-route mobile machines.

BACKGROUND

It is known to perform path planning for various operations, such as agricultural or construction operations. Such planning is often performed manually by the operator of machines working in an environment in an attempt to optimize the operation in terms of efficiency and cost. More recently, computing systems have been developed that suggest operational paths to an operator based on an operational task, field slope, etc.; however, there is much room for improvement on such systems. In some cases, route planning has relied on manual planning, expert knowledge, and simple computations (e.g., heuristic algorithms) performed by computing systems. However, such planning does not consider the complex interactions between various factors, such as terrain, ground conditions, soil type, weather conditions, and machinery capabilities. With the complex interactions not being considered, resulting route planning can include subpar paths and increased fuel consumption, ultimately resulting in higher operational costs and reduced productivity. Thus, it would be advantageous to provide a system (and associated method) which overcomes or at least mitigates one or more problems associated with the prior art systems and considers complex interactions between various factors. It would also be advantageous to provide a system (and associated method) which can update route planning and partially control a mobile machine while the machine is operating in a field.

SUMMARY

Described herein are techniques for using machine learning to update routing plans of mobile machines and control such machines accordingly. The mobile machines can be or include mobile agricultural machines, mobile construction machines, or mobile forestry machines, for example. The techniques disclosed herein provide specific technical solutions to at least overcome the technical problems mentioned in the background section or other parts of the application as well as other technical problems not described herein but recognized by those skilled in the art.

In some embodiments, the techniques include technologies that use machine learning to update a route of a mobile machine while the machine is operating in a field. Some embodiments include a method that includes using machine learning to update a route plan as well as re-route a mobile machine while it is operating in a field. In some cases, the method can also include controlling the mobile machine at least partially according to the updated route plan or the re-routing. With respect to some embodiments, disclosed herein are computerized methods for using machine learning to update a route of a mobile machine, re-route the mobile machine, and control the mobile machine according to the updated route as well as a non-transitory computer-readable storage medium for carrying out technical operations of the computerized methods. The non-transitory computer-readable storage medium has tangibly stored thereon, or tangibly encoded thereon, computer-readable instructions that when executed by one or more devices (e.g., one or more personal computers or servers) cause at least one processor to perform a method for improved systems and methods for using machine learning to update a route of a mobile machine, re-route the mobile machine, and control the mobile machine according to the updated route.

For example, some embodiments include a method for using machine learning to update a route of a mobile machine, re-route the mobile machine, and control the mobile machine according to the updated route. In some examples, the method includes using a mobile machine (e.g., see mobile machine 110 shown in FIG. 1) to perform work in a field and recording travelled path information (e.g., see step 402 shown in FIG. 4). The travelled path information (e.g., see recorded path information 118) includes information about one or more paths followed by the mobile machine when performing the work in the field. The method can also include The method also includes using one or more computing devices (e.g., see computing system 102 or 200 shown in FIGS. 1 and 2 respectively) on the mobile machine to input the travelled path information into a trained deep learning model (e.g., see trained model 107b) and to receive new machine travel paths (e.g., see new paths 120) from the deep learning model (e.g., see step 404). The method also includes using the one or more computing devices on the mobile machine to control the machine to follow the new machine travel paths generated by the trained deep learning model (e.g., see step 406). In some embodiments, the method includes receiving, by a computing system (e.g., see computing system 102 or 200), initial routing information (e.g., see routing information 104 and step 304 depicted in FIG. 3). The initial routing information defines routes followed or to be followed by one or more mobile machines in one or more fields. The method can also include, prior to using the deep learning model to generate new routing information (e.g., see information 108 and step 502 shown in FIG. 5), training, by the computing system, the deep learning model using the initial routing information (e.g., see step 304). The method can also include using, by the computing system, the trained model to generate new routing information specific to the field and the mobile machine (e.g., see step 502). In some examples, the use of the mobile machine to perform the work is based on the new routing information and the new routing information includes the new machine travel paths. In some embodiments, the method also includes storing the trained model on the mobile machine (such as on a computing device of the machine).

In some embodiments, the method includes receiving, by the computing system, initial mobile machine information (e.g., see mobile machine information 112 shown in FIG. 1 and step 602 shown in FIG. 6). Such a method can also include further training, by the computing system, the deep learning model according to the initial mobile machine information (e.g., see step 604). In some embodiments, the initial mobile machine information includes one or more of machine model information, machine type information, machine size information, machine shape information, machine ground footprint information, machine turn radius information, and energy usage information. In some embodiments, the method includes receiving, by the computing system, initial field information (e.g., see field information 114 shown in FIG. 1 and step 702 shown in FIG. 7). Such a method can also include further training, by the computing system, the deep learning model according to the initial field information (e.g., see step 704). In some embodiments, the initial field information includes one or more of field size information, field shape information, field elevation information, field topology information, soil type information, soil condition information, crop type information, crop lodging information, soil compaction information, weed density information, and weed location information. In some embodiments, the method includes receiving, by the computing system, weather data (e.g., see weather data 116 shown in FIG. 1 and step 802 shown in FIG. 8). And, in such examples the method can include further training, by the computing system, the deep learning model according to the weather data (e.g., see step 804). In some embodiments, the initial routing information (e.g., see routing information 104) includes initial waylines (e.g., see wayline 1602 shown in FIG. 16) and the new machine travel paths (e.g., see new paths 120) include new waylines (e.g., see wayline 1604). The new waylines do not include any of the initial waylines since the initial way lines have already been followed by the machine and none of the initial waylines need to be repeated to complete the route. In some embodiments, the method includes extracting, by the computing system, distances between the initial waylines; and further training, by the computing system, the deep learning model (e.g., see model 106) according to the initial waylines and the extracted distances. In some embodiments, the trained model is configured to generate the new machine travel paths to minimize fuel consumption of the mobile machine when performing a given field operation. In some embodiments, the trained model is configured to generate the new machine travel paths to minimize operation time of the mobile machine when performing a given field operation. In some embodiments, the trained model is configured to generate the new machine travel paths to minimize soil compaction caused by the mobile machine when performing a given field operation.

In some embodiments, the method includes using one or more computing devices on the mobile machine (e.g., see mobile machine 110) to input the travelled path information and real-time field attributes into the trained model and to receive new machine travel paths from the trained model (e.g., see step 1902 shown in FIG. 19). The real-time field attributes are sensed by the mobile machine, or by nearby sensors in the field, or by remote sensors capturing field attributes near the machine. Also the method can include using, by the computing system, the trained mode to generate the new machine travel paths according to the travelled path information and the real-time field attributes (e.g., see step 1904). In some embodiments, the method includes using one or more computing devices on the mobile machine to input the travelled path information and real-time machine attributes into the trained model and to receive new machine travel paths from the trained model (e.g., see step 2002 shown in FIG. 20). The the real-time machine attributes are measured or sensed by the mobile machine, or by nearby sensors in the field, or by remote sensors capturing attributes of the machine. Also, the method can include using, by the computing system, the trained model to generate the new machine travel paths according to the travelled path information and the real-time machine attributes (e.g., see step 2004).

These and other important aspects of the invention are described more fully in the detailed description below. The invention is not limited to the particular methods and systems described herein. Other embodiments can be used and changes to the described embodiments can be made without departing from the scope of the claims that follow the detailed description. Within the scope of this application, it should be understood that the various aspects, embodiments, examples, and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

The present disclosure will be understood more fully from the detailed description given below and from the accompanying drawings of various example embodiments of the disclosure.

FIGS. 3 to 12 and 19 to 20 illustrate methods in accordance with some embodiments of the present disclosure.

FIGS. 13A and 13B illustrate a modulus (length) of the vector $\overrightarrow{P_iP}$, in accordance with some embodiments of the present disclosure.

FIG. 14 illustrates that a straight line is easier to follow than a curved line because it is smoother, in accordance with some embodiments of the present disclosure.

FIG. 17A illustrates an initial wayline generated for a crop field and FIG. 17B illustrates additional waylines generated based on the initial wayline.

FIG. 18 illustrates an example graphical output having a slider bar for adjusting the parameters of the waylines according to tradeoffs, in accordance with some embodiments of the present disclosure.

DETAILED DESCRIPTION OF EXAMPLE EMBODIMENTS

Figure 1:
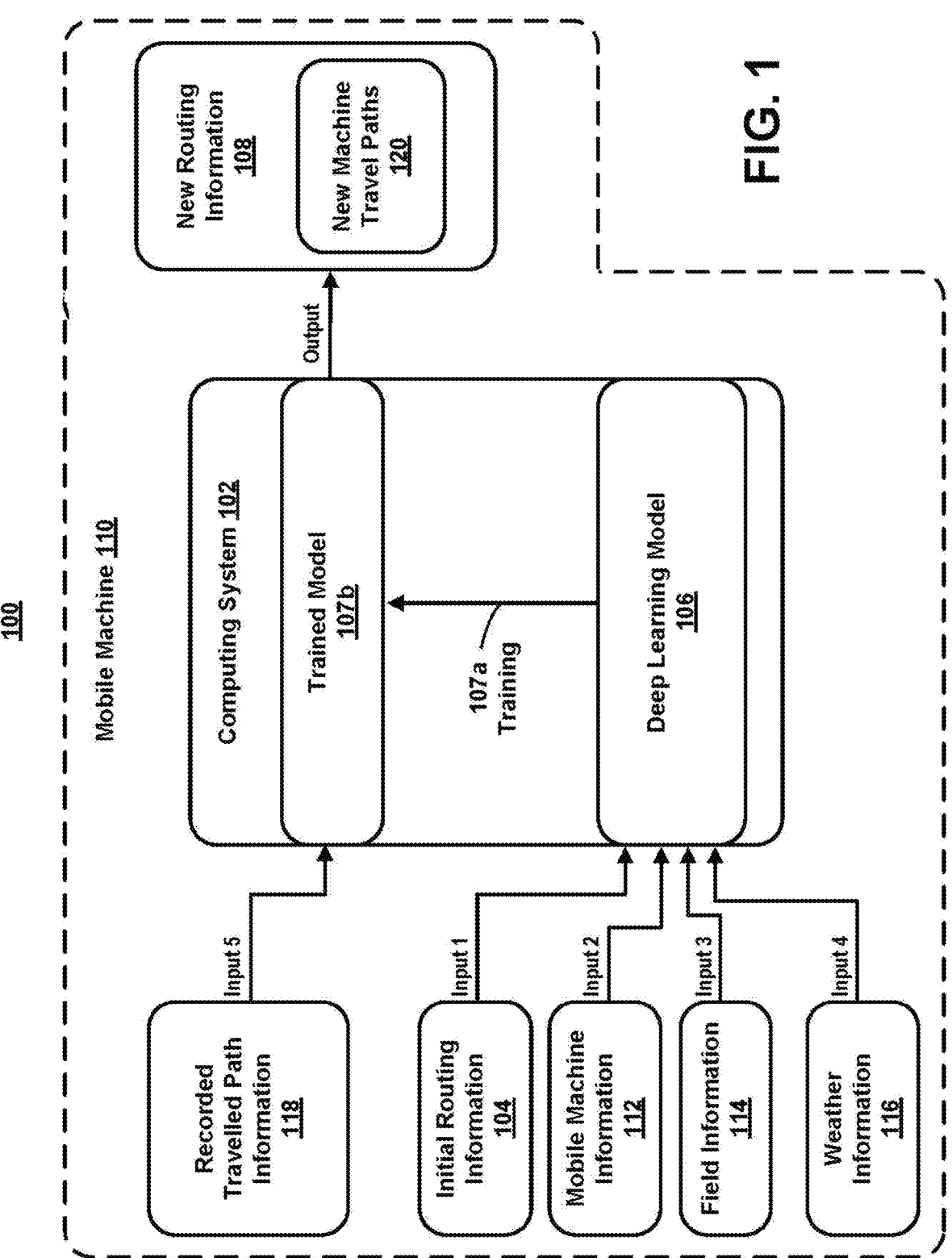
FIG. 1 illustrates an example technical solution to the example technical problems described herein, in accordance with some embodiments of the present disclosure.

Details of example embodiments of the disclosure are described in the following detailed description with reference to the drawings. Although the detailed description provides reference to example embodiments, it is to be understood that the disclosure herein is not limited to such example embodiments. But to the contrary, the disclosure herein includes numerous alternatives, modifications, and equivalents as will become apparent from consideration of the following detailed description and other parts of this disclosure.

Described herein are techniques for using machine learning to generate and update routing plans of mobile machines and control the machines accordingly, such as in real-time while machine is moving through a given field. The mobile machinery can include mobile agricultural machines, mobile construction machines, and mobile forestry machines, for example. The techniques disclosed herein provide specific technical solutions to at least overcome the technical problems mentioned in the background section or other parts of the application as well as other technical problems not described herein but recognized by those skilled in the art. In some embodiments, the techniques include technologies that use machine learning to plan re-routing and corresponding control of the mobile machine. Some embodiments include a method that includes using machine learning to generate or update a route plan as well.

As mentioned, it is known to perform path planning for various industrial operations. Such planning is often performed manually by the operator of machines. More recently, computing systems have been developed that suggest operational paths to an operator based on an operational task, field slope, etc.; however, there is much room for improvement on such systems in that such systems are not sophisticated enough to consider complex interaction between various factors. On the other hand, the techniques described herein provide example improvements to such systems and beyond that that they go beyond manual planning, expert knowledge, and simple computations (e.g., heuristic algorithms) and can consider the complex interactions between various factors, such as terrain, ground conditions, soil type, weather conditions, and machinery capabilities. With the complex interactions being considered by the novel techniques described herein, example technical problems can be resolved. For example, the technologies described here can avoid determinations of subpar paths with increased fuel consumption that ultimately result in higher operational costs and reduced productivity. And, this is just one example of the benefits of the disclosed techniques.

Furthermore, the technologies described herein leverage advancements in artificial intelligence (AI), machine learning, and deep learning, which makes it possible to develop more sophisticated route planning systems capable of considering a multitude of factors and making enhanced decisions from those made by the prior art. The technologies use deep learning models, based on Recurrent Neural Networks (RNNs) or Long Short-Term Memory (LSTM) networks, for example, or Transformer-based models. Such models can generate plans that consider many factors in sequence-based tasks, such as making plans suitable for route planning applications. Combined with GPS technology and the increasing digitization of mobile machinery, large amounts of data has become collectable to facilitate the creation and training of such models. The collected data can be used to train deep learning models, allowing them to learn complex patterns and dependencies between a multitude of factors, including waylines, distances, and other relevant features of a work space or field, as well as complex interactions between various factors, such as terrain, ground conditions, soil type, weather conditions, and machinery capabilities. Also, the models described herein can predict enhanced routes for mobile machines, that consider various efficiencies and factors such as operational time efficiency, fuel efficiency, soil compaction, and machine capabilities. The application of deep learning-based route planning in agricultural, construction, forestry, and other industrial settings has the potential to revolutionize the way corresponding businesses operate. By leveraging AI machine learning, and deep learning to enhance routes, operators of mobile machines can reduce costs, improve efficiency, and minimize the environmental impact of their operations.

FIG. 1 illustrates an example technical solution to the example technical problems described herein. The technical solution, shown in FIG. 1, can include or be a part of the techniques and technologies described herein (such as any one of the methods 300, 400, 500, 600, 700, 800, 900, 1200, 1900, and 2000 shown in FIGS. 3, 4, 5, 6, 7, 8, 9, 12, 19 and 20 respectively) and can provide specific technical solutions to at least overcome the technical problems mentioned in the background section or other parts of the application as well as other technical problems not described herein but recognized by those skilled in the art. FIG. 1 depicts a network 100, such as a computer network, within which a computing system 102 receives various inputs (e.g., see initial routing information 104, mobile machine information 112, field information 114, and weather information 116). These inputs and others can be received from other computing systems within the network 100. The various inputs include or are related to some of the efficiencies and factors (such as operational time efficiency, fuel efficiency, soil compaction, and machine capabilities) that is considered by the computing system in route planning and the determination of routes within a field. As shown, the computing system includes a deep learning model 106 that is trained through various machine learning and deep learning techniques (e.g., see training 107a), and the result of the training provides a trained model 107b. Once the model is trained (e.g., see trained model 107b), it can be used to generate new routing information 108 for route planning within a field. Also, as shown, the computing system 102 is a part of a mobile machine 110 as are the inputs and outputs of the computing system (including the inputs of the deep learning model 106 and the output of the trained model 107b). In some embodiments, the computing system 102 and the inputs and outputs of the computing system are part of a remote system in that the remote system is physically and geographically separated from the mobile machine 110 but communicates with a system or controller of the machine over a telecommunications or computer network (such as network 100). The mobile machine 110 can be or include an agricultural machine, a construction machine, a forestry machine, or some other type of mobile industrial machine that can be configured to follow routes.

In addition to the aforesaid four inputs including information 104, 112, 114, and 116, FIG. 1 also illustrates a fifth input of the computing system 102 that includes recorded travel path information 118. In some embodiments, as illustrated by FIG. 1, the mobile machine 110 is used to perform work in a field and record travelled path information related to the traveled path of the mobile machine. The recorded travelled path information includes information about one or more paths followed by the mobile machine 110 when the machine performs the work in the field. Also, one or more computing devices on the mobile machine 110 (including the computing system 102) are used to input the travelled path information 118 into the trained model 107b model and to receive new machine travel paths 120 from the trained model. The new machine travel paths 120 are included in the new routing information 108 when new routing information is updated after the recorded travelled path information 118 is inputted into and processed through the trained model 107b. Also, in such embodiments, the one or more computing devices on the mobile machine 110 (including the computing system 102) are used to control the machine to follow the new machine travel paths 120 generated by the trained model 107*b*.

The computing system 102 includes electronics such as one or more controllers, sensors, busses, and computers. The computing system 102 includes at least a processor, memory, a communication interface and can include one or more sensors, which can make the mobile machine 110 an individual computing device. In the case of the network 100 including the Internet, the mobile machine 110 can be considered Internet of Things (IoT) device. Also, in some embodiments, the computing system 102 is a part of a cloud computing system. The computing system 102 and the mobile machine 110 can include both electronic hardware and software that can integrate between the systems of the computing system and the mobile machine 110. And, such hardware and software (such as controllers and sensors and other types of electrical and/or mechanical devices) can be configured to a communicate with a remote computing system via the communications network 100.

In some embodiments, where the mobile machine 110 is an agricultural machine, it can include or be a combine harvester, a tractor, a planter, a sprayer, a baler, etc. In some embodiments, where the mobile machine 110 is a construction machine, it can include or be an excavator, a compaction machine (such as one with rollers), a loader, a bulldozer, a skid steer machine, a grader, etc. In some embodiments, where the mobile machine 110 is a forestry machine, it can include or be a delimber, a feller buncher, a stump grinder, a mulcher, a yarder, a forwarder, log loader, a harvester, etc. In some embodiments, the mobile machine 110 can be or include a vehicle in that it is self-propelling. Also, in some embodiments, the mobile machine 110 can be a part of a group of similar machines or a group of different types of mobile machines.

The network 100 can include one or more local area networks (LAN(s)) and/or one or more wide area networks (WAN(s)). In some embodiments, the network 100 includes the Internet and/or any other type of interconnected communications network. The network 100 can also include a single computer network or a telecommunications network. More specifically, in some embodiments, the network 100 includes a local area network (LAN) such as a private computer network that connects computers in small physical areas, a wide area network (WAN) to connect computers located in different geographical locations, and/or a middle area network (MAN) to connect computers in a geographic area larger than that covered by a large LAN but smaller than the area covered by a WAN.

At least each shown component of the network 100 (including computing system 102) can be or include a computing system which includes memory that includes media. The media includes or is volatile memory components, non-volatile memory components, or a combination of thereof. In general, in some embodiments, each of the computing systems includes a host system that uses memory. For example, the host system writes data to the memory and read data from the memory. The host system is a computing device that includes a memory and a data processing device. The host system includes or is coupled to the memory so that the host system reads data from or writes data to the memory. The host system is coupled to the memory via a physical host interface. The physical host interface provides an interface for passing control, address, data, and other signals between the memory and the host system.

Figure 2:
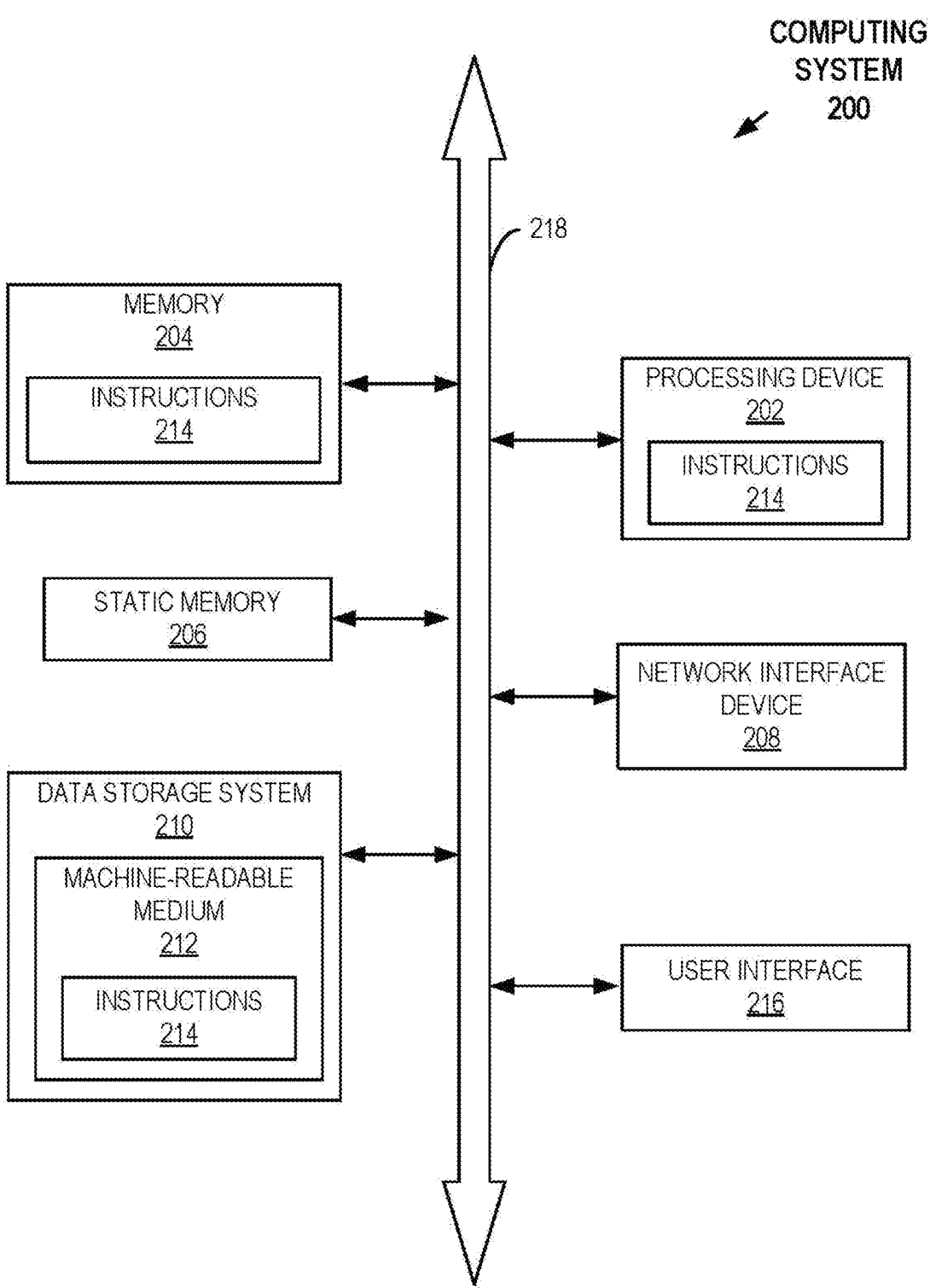
FIG. 2 illustrates a block diagram of example aspects of a computing system, in accordance with some embodiments of the present disclosure.

FIG. 2 illustrates a block diagram of example aspects of a computing system 200 that can implement the technical solution shown in FIG. 1 or each main part of the solution.

Also, FIG. 2 illustrates parts of the computing system 200 within which a set of instructions are executed for causing a machine (such as a computer processor or processing device 202) to perform any one or more of the methodologies discussed herein performed by a computing system (e.g., see the method steps of the methods 300, 400, 500, 600, 700, 800, 900, 1200, 1900 and 2000 shown in FIGS. 3, 4, 5, 6, 7, 8, 9, 12, 19 and 20 respectively). In some embodiments, the computing system 200 operates with additional computing systems to provide increased computing capacity in which multiple computing systems operate together to perform any one or more of the methodologies discussed herein that are performed by a computing system.

In some embodiments, the computing system 200 corresponds to a host system that includes, is coupled to, or utilizes memory or is used to perform the operations performed by any one of the computing systems described herein. In some embodiments, the machine is connected (e.g., networked) to other machines in a LAN, an intranet, an extranet, or the Internet. In some embodiments, the machine operates in the capacity of a server in a client-server network environment, as a peer machine in a peer-to-peer (or distributed) network environment, or as a server in a cloud computing infrastructure or environment. In some embodiments, the machine is a personal computer (PC), a tablet PC, a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein performed by computing systems.

The computing system 200 includes a processing device 202, a main memory 204 (e.g., read-only memory (ROM), flash memory, dynamic random-access memory (DRAM), etc.), a static memory 206 (e.g., flash memory, static random-access memory (SRAM), etc.), and a data storage system 210, which communicate with each other via a bus 218. The processing device 202 represents one or more general-purpose processing devices such as a microprocessor, a central processing unit, or the like. More particularly, the processing device can include a microprocessor or a processor implementing other instruction sets, or processors implementing a combination of instruction sets. Or, the processing device 202 is one or more special-purpose processing devices such as an application-specific integrated circuit (ASIC), a field programmable gate array (FPGA), a digital signal processor (DSP), a network processor, or the like. The processing device 202 is configured to execute instructions 214 for performing the operations discussed herein performed by a computing system. In some embodiments, the computing system 200 includes a network interface device 208 to communicate over a communications network. Such a communications network can include one or more local area networks (LAN(s)) and/or one or more wide area networks (WAN(s)). In some embodiments, the communications network includes the Internet and/or any other type of interconnected communications network. The communications network can also include a single computer network or a telecommunications network.

The data storage system 210 includes a machine-readable storage medium 212 (also known as a computer-readable medium) on which is stored one or more sets of instructions 214 or software embodying any one or more of the methodologies or functions described herein performed by a computing system. The instructions 214 also reside, completely or at least partially, within the main memory 204 or within the processing device 202 during execution thereof by the computing system 200, the main memory 204 and the processing device 202 also constituting machine-readable storage media. While the machine-readable storage medium 212 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that causes the machine to perform any one or more of the methodologies of the present disclosure performed by a computing system. The term "machine-readable storage medium" shall accordingly be taken to include solid-state memories, optical media, or magnetic media.

Also, as shown, the computing system 200 includes user interface 216 that includes a display, in some embodiments, and, for example, implements functionality corresponding to any one of the UI devices disclosed herein. A UI, such as UI 216, or a UI device described herein includes any space or equipment where interactions between humans and machines occur. A UI described herein allows operation and control of the machine from a human user, while the machine simultaneously provides feedback information to the user. Examples of a user interface, or UI device include the interactive aspects of computer operating systems (such as GUIs), machinery operator controls, and process controls.

FIGS. 3 to 12 and 19 to 20 illustrate methods in accordance with some embodiments of the present disclosure. Methods 300, 400, 500, 600, 700, 800, 900, 1200, 1900 and 2000 of the corresponding figures are performed by any one of the computing systems described herein (e.g., see computing system 102 or 200 depicted in FIGS. 1 and 2 respectively). In some systems of the technologies disclosed herein, any steps of embodiments of the methods described herein are implementable by executing instructions corresponding to the steps, which are stored in memory (such as the instructions 214).

Deep learning-based route planning as well as re-routing and corresponding control for mobile machines using recorded trajectory and other types of routing information involves the application of neural network architectures to analyze and predict the optimal paths for mobile machinery based on historical movement data. By leveraging the power of deep learning, a model can capture complex patterns and dependencies within the recorded trajectories and other routing information, allowing for more efficient route planning and execution. Such functionality is provided through the combination methods 300 and 400 shown in FIGS. 3 and 4 respectively as well as the other methods described herein that include or can be combined with the steps of methods 300 and 400.

As shown in FIG. 3, method 300 begins with step 302, which includes receiving, by a computing system (e.g., see computing system 102 or 200 shown in FIG. 1 or 2 respectively), initial routing information (e.g., see initial routing information 104 depicted in FIG. 1). In some examples, the initial routing information defines routes followed by or to be followed by one or more mobile machines in one or more fields. In some embodiments, the one or more mobile machines include one or more agricultural machines. In some other examples, the one or more mobile machines include one or more construction machines. Also, the one or more mobile machines can include one or more forestry machines such as various types of mobile logging equipment. Step 302 can also include or rely on data collection by the computing system or other systems communicatively coupled to the computing system. The data collection can include gathering a dataset containing recorded trajectories of mobile machines, along with other relevant information, such as machine capabilities, crop type, soil type, elevation data, weather conditions, etc. In some embodiments, the initial routing information is recorded by the one or more mobile machines while operating in the one or more fields. In some embodiments, the initial routing information is predetermined routing information derived from designed routes to be followed by the one or more mobile machines in the one or more fields. And, in some examples, the initial routing information is a combination of data recorded by the one or more mobile machines while operating in the one or more fields and predetermined routing information derived from designed routes to be followed by the one or more mobile machines in the one or more fields.

At step 304, the method 300 continues with training, by the computing system, a deep learning model (e.g., see deep learning model 106 depicted in FIG. 1) using the initial routing information. In some embodiments, the trained model is configured to generate the new routing information to minimize fuel consumption of the mobile machine when performing a given field operation. Also, in some examples, the trained model is configured to generate the new routing information to minimize operation time of the mobile machine when performing a given field operation. Also, in some examples, the trained model is configured to generate the new routing information to minimize soil compaction caused by the mobile machine when performing a given field operation. Before or after, or within step 304, the method 300 can include feature extraction. Feature extraction can include extracting relevant features from the recorded trajectories, such as waylines, distances between waylines, and any additional features that might be helpful in route planning. Also, Before or after, or within step 304, the method 300 can include model selection. The model selection can include choosing a suitable deep learning model for sequence-based data, such as recurrent neural networks (RNNs), long short-term memory (LSTM) networks, or transformer-based models. Such models are capable of capturing temporal dependencies and learning complex patterns in the data. In some embodiments, the trained model of step 304 includes at least one of RNNs, LSTM networks, or transformer-based models. In some embodiments, the training at step 304 according to preprocessed data, using the extracted features from the feature extraction as input sequences.

At step 306, the method 300 continues with using, by the computing system, the trained model (e.g., see trained model 107*b* depicted in FIG. 1) to generate new routing information (e.g., see new routing information 108 depicted in FIG. 1) for a given field. The method 300 can also include model evaluation. Such model evaluation can be a part of the use of the model at step 306. And in some examples, the evaluation can include evaluation of the trained model's performance on a dataset to ensure its generalization is valid to unseen data. The evaluation can use metrics, such as mean absolute error, root mean squared error, or custom metrics relevant to the specific application. The method 300 can also include model deployment. The deployment can include integrating the trained model into the mobile machine's control system to provide real-time route planning and optimization. Such deployment can occur at step 306.

The method 300, at step 302, 304 or 306, can include continuous improvement such as regularly updating the model with new data to ensure its performance remains accurate and up-to-date. The improvement can also include monitoring the model's performance and retraining or fine-tuning the model per application of it or as needed. By implementing deep learning-based route planning for mobile machines using recorded trajectories and other relevant routing information, it is possible to enhance routes for various factors, such as fuel efficiency, reduced soil compaction. This can lead to improved productivity, cost savings, and better overall sustainability of operations.

As shown in FIG. 4, method 400, at step 402, begins with using a mobile machine (e.g., see mobile machine 110 depicted in FIG. 1) to perform work in a field and recording travelled path information. The recorded path information includes information about path(s) followed by the mobile machine when performing the work in the field (e.g., see recorded path information 118). Subsequently, the method 400, at step 404, continues with using computing device(s) on the mobile machine to input the recorded path information into a deep learning model (such as the trained model of method 300) and to receive new machine travel paths (e.g., see new travel paths 120) from the deep learning model. Next, at step 406, the method 400 continues with using the computing device(s) on the mobile machine to control the machine to follow the new machine travel paths generated by the deep learning model. In some embodiments, step 406 includes communicating, by the computing system, the new routing information, such as the new paths, or a derivative thereof to an electronic control unit (ECU) of the mobile machine as well as at least partially controlling, by the ECU, a movement of the machine according to the new routing information or the derivative thereof. In some embodiments, the mobile machine of method 400 and the other methods disclosed herein includes an agricultural machine. In some other examples, the mobile machine includes a construction machine. Also, the mobile machine can include a forestry machine such as some sort of mobile logging equipment.

As shown in FIG. 5, method 500 begins with the steps from method 300 or method 400, or a combination of the two methods (i.e., steps 302, 304, 306, 402, 404, and 406). Subsequently, method 500 continues with step 502, which includes using, by the computing system, the trained model (such as the trained model of method 300) to generate the new routing information (including the new machine travel paths) for the field and the mobile machine. The, at step 406 (similar to method 400), method 500 continues with using the computing device(s) on the mobile machine to control the machine to follow the new machine travel paths generated by the deep learning model.

As shown in FIG. 6, method 600 begins with step 302 of method 300, which includes the receiving of the initial routing information. And, then continues with step 304, which includes the training of the deep learning model using the initial routing information. Also, the method 600 can begin with step 402 of method 400 (using a mobile machine to perform work in a field and recording travelled path information). Also, as shown, the method 600 starts with step 602, which includes receiving, by the computing system, initial mobile machine information (e.g., see initial mobile machine information 112 depicted in FIG. 1). With method 600, at step 604, the method includes further training, by the computing system, the deep learning model according to the initial mobile machine information in addition to the initial routing information. Also, the method

600 can end with step 306 of method 300 (using the trained model to generate new routing information for a given field) or steps 404 and 406 of method 400 (using computing device(s) on the mobile machine to input the recorded path information into a deep learning model and to receive new machine travel paths from the model, and using the computing device(s) to control the machine to follow the new paths generated by the model). In some cases, the initial mobile machine information includes one or more of machine model information, machine type information, machine size information, machine shape information, machine ground footprint information, machine turn radius information, and energy usage information. In some embodiments, the initial mobile machine information is recorded mobile machine information recorded from the one or more mobile machines in the one or more fields, or the initial mobile machine information is predetermined mobile machine information derived from designed machine attributes of the one or more mobile machines, or some combination thereof.

As shown in FIG. 7, method 700 begins with step 302 of method 300, which includes the receiving of the initial routing information. And, then continues with step 304, which includes the training of the deep learning model using the initial routing information. Also, the method 600 can begin with step 402 of method 400 (using a mobile machine to perform work in a field and recording travelled path information). Also, as shown, the method 700 starts with step 702, which includes receiving, by the computing system, initial field information (e.g., see initial field information 114 depicted in FIG. 1). With method 700, at step 704, the method includes further training, by the computing system, the deep learning model according to the initial field information in addition to the initial routing information. Also, the method 600 can end with step 306 of method 300 (using the trained model to generate new routing information for a given field) or steps 404 and 406 of method 400 (using computing device(s) on the mobile machine to input the recorded path information into a deep learning model and to receive new machine travel paths from the model, and using the computing device(s) to control the machine to follow the new paths generated by the model). In some cases, the initial field information includes one or more of field size information, field shape information, field elevation information, field topology information, soil type information, soil condition information, crop type information, crop lodging information, soil compaction information, weed density information, and weed location information. In some embodiments, the initial field information is recorded field information recorded from the one or more fields, or the initial field information is predetermined or preselected field information from known field attributes, or some combination thereof.

As shown in FIG. 8, method 800 begins with step 302 of method 300, which includes the receiving of the initial routing information. And, then continues with step 304, which includes the training of the deep learning model using the initial routing information. Also, the method 800 can begin with step 402 of method 400 (using a mobile machine to perform work in a field and recording travelled path information). Also, as shown, the method 800 starts with step 802, which includes receiving, by the computing system, weather data (e.g., see weather data 116 depicted in FIG. 1). With method 800, at step 804, the method includes further training, by the computing system, the deep learning model according to the weather data in addition to the initial routing information. Also, the method 800 can end with step

306 of method 300 (using the trained model to generate new routing information for a given field) or steps 404 and 406 of method 400 (using computing device(s) on the mobile machine to input the recorded path information into a deep learning model and to receive new machine travel paths from the model, and using the computing device(s) to control the machine to follow the new paths generated by the model). In some cases, the initial weather data includes one or more of datasets collected from one or more of thermometers, barometers, radar, wind vanes, anemometers, transmissometers, hygrometers, etc. The datasets can include measured temperature, air pressure, rain or snow locations, wind direction, wind speed, atmospheric visibility, humidity, etc. In some cases, the initial weather data includes one or more datasets collected from one or more satellites, radiosondes, etc.

In some embodiments, the training includes determining a correlation including a degree to which at least one quantity in the initial mobile machine information is linearly associated with at least one quantity in the initial routing information. In some embodiments, the training includes determining a correlation including a degree to which at least one quantity in the initial field information is linearly associated with at least one quantity in the initial routing information. In some embodiments, the training includes determining a correlation including a degree to which at least one quantity in the initial field information is linearly associated with at least one quantity in the initial mobile machine information. In some embodiments, the training includes determining a correlation including a degree to which at least one quantity in the weather data is linearly associated with at least one quantity in the initial routing information, the field information, the mobile machine information, or a combination thereof.

Figure 10:
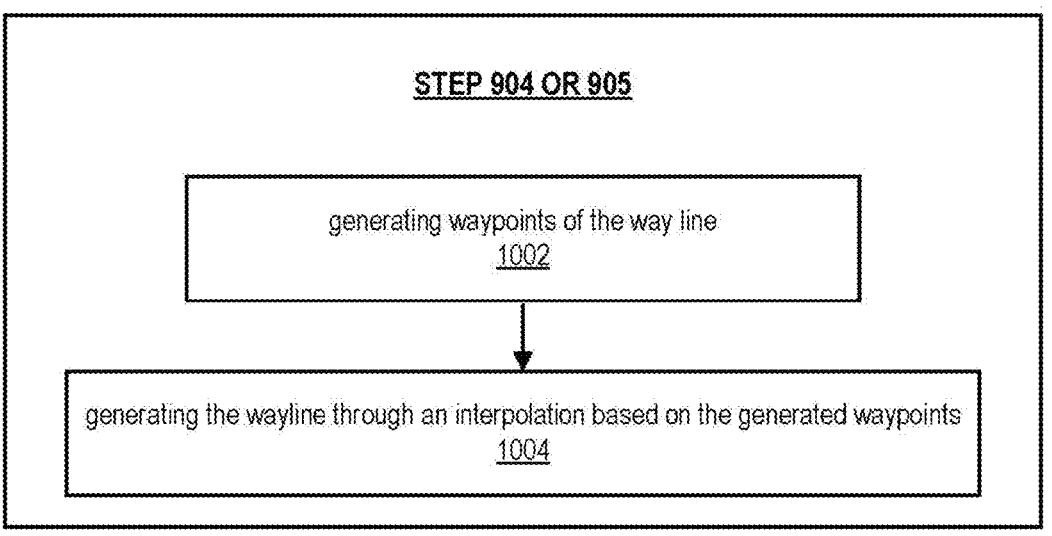
Figure 11:
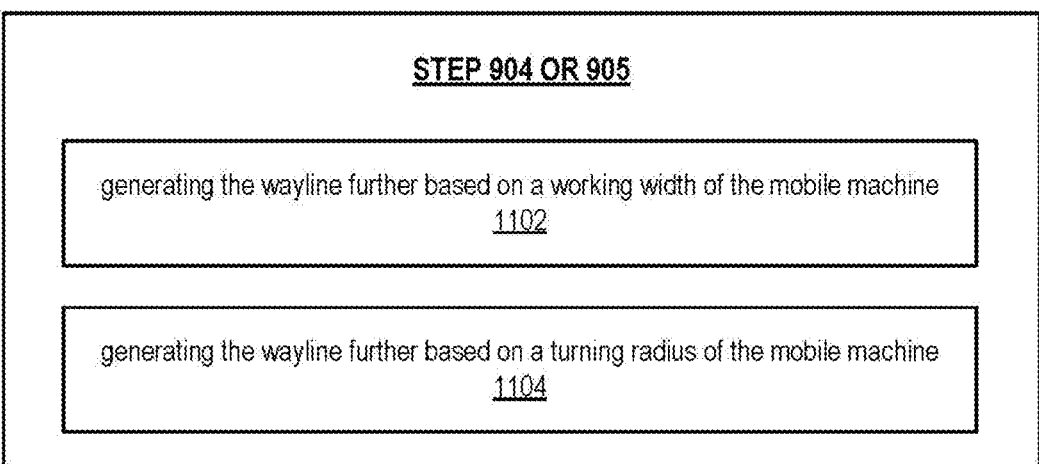

FIGS. 9 and 12 illustrate methods 900 and 1200 and FIGS. 10 and 11 illustrate sub-methods of method 900, respectively, in accordance with various embodiments of the present disclosure. For example, in some embodiments, the new routing information includes a set of waylines. And, in such instances, the using of the trained model (e.g., see step 306 of method 300 or step 502 of method 500) can include or be combined with receiving, by the computing system, parameters of a predetermined wayline for using a given machine in a given field and then generating, by the computing system, a last generated wayline for the set of waylines based on (1) parameters of the given crop field, (2) the trained model, and (3) the received parameters of predetermined wayline. Also, the using of the trained model can include associating, by the computing system, the last generated wayline to the set of waylines. Furthermore, the use of the trained model can include determining, by the computing system, whether the set of waylines covers the given field. Also, the use of the trained model can include generating, by the computing system, a new wayline for the set of waylines based on the generated new routing information and the parameters of the last generated wayline, when the set of waylines does not cover the crop field after the lasted generated wayline is generated and associated with the set of waylines. Also, the use of the trained model can include completing generation of the set of waylines, by the computing system, when the set of waylines does cover the field after the last generated wayline is generated and associated with the set of waylines. In such examples and others, the set of waylines can include an ordered set of waylines. And, in some cases, the generation of the last generated wayline includes generating, by the computing system, waypoints of the last generated wayline, and wherein the generation of the last generated wayline further includes generating, by the computing system, the wayline through an interpolation based on the generated waypoints. These processes and others, which can be a part of the use of the trained model, can be found in the methods 900 and 1200.

Methods 900 and 1200 are performed by a computing system (which can be the computing system 102 or 200) and a controller of a mobile machine. And, as mentioned, the methods 900 and 1200 can be a part of the use of the trained model at step 306 of method 300 or step 402 of method 400. For the sake of simplicity, the methods 900 and 1200 will be described as being performed by a computing system and a controller; however, it is to be understood that the computing system could be replaced with multiple systems and the controller could be replaced with multiple controllers.

As shown in FIG. 9, method 900 begins with step 902, which includes receiving, by a computing system, parameters of a predetermined wayline for using a selected mobile machine in a selected field (such as a selected crop field, a selected construction zone, or a selected forestry field or area of a forest). The mobile machine can be an agricultural mobile machine, a construction mobile machine, a forestry mobile machine, or another type of mobile machine used for another type of industrial application. The method 900 continues with step 904, which includes generating, by the computing system, a last generated wayline for a set of waylines based on the received parameters of predetermined wayline. The method 900 then continues with step 906, which includes associating, by the computing system, the last (or a newly) generated wayline to the set. The method 900 then continues with steps 908 and 909, which includes determining, by the computing system, whether the set covers the field. The method 900 essentially returns to step 904, when the set does not cover the field (e.g., see step 905). And, then step 906, which includes associating the last (or a newly) generated wayline to the set is repeated, and so on. Otherwise, the method 900 then continues with step 910, which includes completing, by the computing system, generation of the set of waylines. And, after the completion of the set, the method 900 continues with generating, by the computing system, a route of the mobile machine in the field based on the completed set of waylines (at step 912). At step 914, the method 900 continues with transmitting, by the computing system, the route to a controller of the mobile machine that controls the steering of the mobile machine based on the route. And, finally, at step 916, the method 900 continues with controlling, by the controller of the mobile machine, the mobile machine according to the route.

As shown in FIG. 10, step 904 or 905 can include step 1002, which includes generating waypoints of the way line. Step 904 or 905 also can include step 1004, which includes generating the wayline through an interpolation based on the generated waypoints. As shown in FIG. 11, step 904 or 905 can include step 1102, which includes generating the wayline further based on a working width of the mobile machine. Step 904 or 905 also can include step 1104, which includes generating the wayline further based on a turning radius of the mobile machine.

As shown in FIG. 12, method 1200 begins with step 1202, which includes receiving, by a computing system, parameters of a predetermined wayline for using a selected mobile machine in a selected field and receiving a turning radius and a working width of the machine. The mobile machine can be any type of mobile machine described herein and the field can be any type of field described herein. The method 1200 continues with step 1204, which includes generating, by the computing system, a last generated wayline for a set of waylines based on the received parameters of predetermined wayline and the received turning radius and working width. The step 1204 also includes generating waypoints of the wayline based on the received parameters, the radius, and the width (at sub-step 1204A) and generating the wayline through an interpolation based on the generated waypoints (at sub-step 1204B). The method 1200 also includes step 906 from method 900, which includes associating the last (or the newly) generated wayline to the set. The method 1200 also includes steps 908 and 909 from method 900, which includes determining whether the set covers the field.

The method 1200, like method 900, essentially returns to steps 1204, when the set does not cover the field (e.g., see step 1205, wherein the computing system generates a new wayline for the set based on the parameters of the last generated wayline and the radius and the width). And, then step 906, which includes associating the last (or a newly) generated wayline to the set is repeated, and so on. Otherwise, the method 1200 then continues with step 910 (similar to method 900), which includes completing the generation of the set of waylines. And, after the completion of the set, the method 900 continues with generating a route of the mobile machine in the field based on the completed set of waylines (at step 912). And, finally, at step 914, the method 1200 continues with transmitting the route to a controller of the mobile machine, and at step 916, the method 1200 continues with controlling, by the controller of the mobile machine, the mobile machine according to the route.

Figures 15, 16:
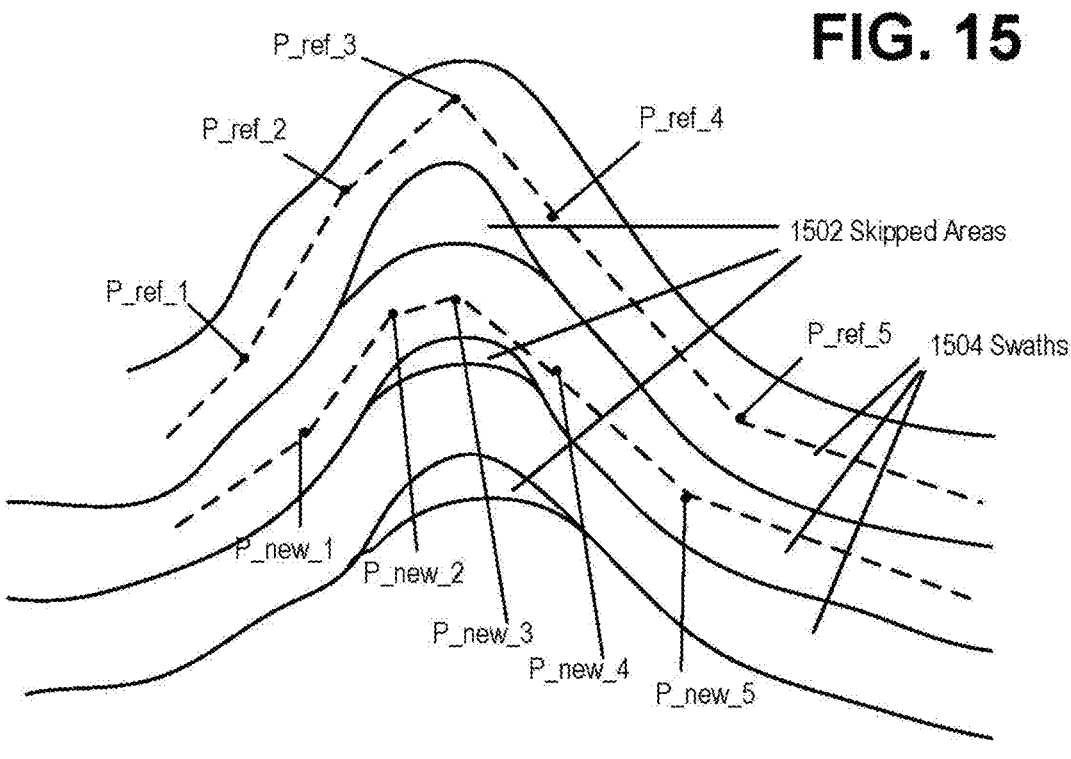
FIG. 15 illustrates that skipped areas in a set of waylines occur and increase in size with greater curve in a preceding wayline, with respect to a new wayline, in accordance with some embodiments of the present disclosure.
FIG. 16 illustrates an example relationship between a previously generated wayline and a new wayline generated based on the previously generated wayline, in accordance with some embodiments of the present disclosure.

In some embodiments of method 1200 as well as some other embodiments, a feature of the method is that it explicitly considers a steering angle constraint (e.g., a curvature constraint) of a mobile machine and generates waylines producing minimum possible overlap with adjacent waylines while reducing that amount and extent of skipped areas of the field (e.g., see skipped areas 1502 between swaths 1504 of a field—shown in FIG. 15). A planning method for planning waylines in a route of a mobile machine through a selected area of a field can include any one or more of the steps described herein, including any one or more of the steps from methods 900 and 1200. And, in some examples, the planning method includes results that excludes skipped areas completely. The generated waylines of the planning method can be used as guidance for a vehicle with an Ackerman mechanism or another type of steering mechanisms. The planning method can be formulated as a quadratic programming (QP) problem as provided by the following objective function (or cost function): min (cost=w1·cos1+w2·cost2+w3·cost3) (Eq. 1). With some embodiments of the objective function (i.e., Eq. 1), the following equations are used as bases for cost1, cost2, and cost3 of the objective function.

$$\text{cost1} = \sum_{i=1}^{n-1}(x_{i-1} + x_{i+1} - 2x_i)^2 + (y_{i-1} + y_{i+1} - 2y_i)^2 \quad \text{(Eq. 2)}$$

$$\text{cost2} = \sum_{i=0}^{n-1}(x_{i+1} - x_i)^2 + (y_{i+1} - y_i)^2 \quad \text{(Eq. 3)}$$

$$\text{cost3} = \sum_{i=0}^{n}\left((x_i - (x_i^{ref} + e_{x_i}^{ref}*w))^2 + ((y_i - (y_i^{ref} + e_{y_i}^{ref}*w))^2\right) \quad \text{(Eq. 4)}$$

And, in such embodiments and some other examples, the following constraints are used with the objective function (i.e., each constraint is represented by an s.t. constraint function).

$$0.8w \le (x_i - x_i^{ref})/e_{x_i}^{ref} \le 1.2w \quad \text{(Eq. s.t.1)}$$

$$0.8w \le (y_i - y_i^{ref})/e_{y_i}^{ref} \le 1.2w \quad \text{(Eq. s.t.2)}$$

$$(x_{i-1} + x_{i+1} - 2x_i)^2 + (y_{i-1} + y_{i+1} - 2y_i)^2 - \text{slack}_i \le (\Delta s \times k)^2 \quad \text{(Eq. s.t.3)}$$

$$0 \le \text{slack}_i \le \infty \quad \text{(Eq. s.t.4)}$$

$$e_{y_i}^{ref}/e_{x_i}^{ref} - 0.1 \le (y_i - y_i^{ref})/(x_i - x_i^{ref}) \le e_{y_i}^{ref}/e_{x_i}^{ref} + 0.1 \quad \text{(Eq. s.t.5)}$$

Also, in such embodiments and some other examples, the following equation is used.

$$\vec{n} = (e_{x_i}^{ref}, e_{y_i}^{ref}) \text{ is the normal unit vector at point } (x_i^{ref}, y_i^{ref}) \quad \text{(Eq. 5)}$$

In some embodiments, the geometric interpretation of the objective function of the planning method considers weights w1, w2 and w3—which can be user defined weights, e.g., see FIG. 18. If the operator cares less about one parameter of the set of waylines than another parameter, a lower value can be applied to corresponding one or more weights of the objective function via the slider (e.g., if the operator cares less about skipped area size than wayline length, then a lower value can be given to w3; which coincides with minimization of skipped area being a lower priority than wayline length in the objective functions).

FIGS. 13A and 13B illustrates a modulus (length) of the vector $\overrightarrow{P_iP}$, which is related to cost1 (e.g., see Eq. 2). With cost1, the modulus (length) of the vector $\overrightarrow{P_iP}$, shown in FIGS. 13A and 13B, can be understood as: $|\overrightarrow{P_iP}| = |\overrightarrow{P_iP_{i-1}}| + |\overrightarrow{P_iP_{i+1}}|$. As $|\overrightarrow{P_iP}|$ gets smaller, the three points $P_{i-1}$, $P_i$, $P_{i+1}$ tends to be on a straight line. In other words, the smaller the $|\overrightarrow{P_iP}|$, the more straight the curve; therefore, the smoother the path. The squared modulus of $\overrightarrow{P_iP} = (x_{i-1} - x_i, y_{i+1} - y_i) + (x_{i+1} - x_i, y_{i+1} - y_i) = (x_{i-1} + x_{i+1} - 2x_i, y_{i-1} + y_{i+1} - 2y_i)$ is $(x_{i-1} + x_{i+1} - 2x_i)^2 + (y_{i-1} + y_{i+1} - 2y_i)^2$.

FIG. 14 illustrates that a straight line is easier to follow than a curved line because it is smoother. This notion relates to cost2 (e.g., see Eq. 3). With respect to Cost2, the plan considers minimizing the total length of a wayline, since a shorter wayline length means a straighter wayline and a straighter wayline means a smoother of the wayline. As showed in the below figure, the straight line is easier to follow for a mobile machine than the curved line because it is smoother and will have lesser turning angles.

FIG. 15 illustrates that skipped areas 1502 in a set of waylines occur and increase in size with greater curve in a preceding wayline, with respect to a new wayline, in accordance with some embodiments of the present disclosure. FIG. 16 illustrates an example relationship between a previously generated wayline 1602 and a new wayline 1604 generated based on the previously generated wayline, in accordance with some embodiments of the present disclosure. With respect to cost3 (e.g., see Eq. 4), the plan considers or uses minimizing the overlapping of adjacent waylines while achieving the goal of reducing skipped area between adjacent waylines. FIG. 15 illustrates that skipped areas in a set of waylines occur and increase in size with greater curve in a preceding and adjacent wayline, with respect to a new wayline. In some embodiments, the geometric interpretation of the objective function also considers or uses equations s.t.1 and s.t.2. s.t.1 and s.t.2 relate to distance constraint for points of adjacent waylines where distance between each pair of point at adjacent waylines only allow between certain conditions (e.g., 0.8*w and 1*w, w is the working width of the machine). For example, see FIGS. 15 and 16, where it is illustrated that at least two waylines each have multiple waypoints. And, as shown in FIG. 15, p_new$_i$ are wayline points generated based on corresponding point p_ref$_i$ at the reference (or previous) wayline by using a traditional offset method, at least to some extent, which leads to skipped areas between swaths. In objective functions of the methods describe herein, the constraint for points of adjacent waylines allows the point p_new$_i$ to freely move (e.g., search a solution) between a given distance (e.g., the given distance 0.8*w and 1*w) with a goal to reduce the skipped area and at the same time to keep the produced overlap between adjacent waylines as much as possible. Note that the distance is the length between p_new$_i$ to its corresponding point p_ref$_i$ at reference (or previous) wayline, and, for example, the previously mentioned values of 0.8 and 1 are adjustable values. Such values can be adjusted through a GUI in some embodiments (see FIG. 18).

In some embodiments, the geometric interpretation of the objective function also considers or uses equation s.t.3, which relates to a curvature $\kappa=1/R_{min}$ constraint, to make sure the generated wayline satisfies minimum turning radius $R_{min}$ constraint. In some embodiments, the geometric interpretation of the objective function also considers or uses equation s.t.4 to ensure a solution by convergence, and with a slack variable greater than 0 is introduced into the curvature constraint. In some embodiments, the geometric interpretation of the objective function also considers or uses equation s.t.5 as an offset direction constraint. As shown in the below figure, the offset direction to generate next waypoint p_new$_i$ based on the p_ref$_i$ is limited to the range [ $\vec{n}$−0.1,$\vec{n}$+0.1] and the value 0.1 is adjustable. In some embodiments, the geometric interpretation of the objective function also considers that each next new wayline L$_i$ with waypoints p_new$_i$ is generated based on the previous wayline L$_{i-1}$ with waypoints p_ref$_i$. Before generating the next wayline line, the waypoints p_ref$_i$ of previous wayline L$_{i-1}$ is connected by some form of interpolation (e.g., cubic splines, such as cubic B-splines). This is to form a $C^2$ continuous path, which is to get a smooth vehicle path. Also, it is to be understood that such equations and methods can also generate straight A-B waylines when the reference line is straight A-B line.

FIG. 17A illustrates an initial wayline generated for a crop field and FIG. 17B illustrates additional waylines generated based on the initial wayline according to one or more of the equations provided herein (e.g., equations 1, 2, 3, 4, 5, s.t.1, s.t.2, s.t.3, s.t.4, and s.t.5). Waylines generated by such a plan and such equations are shown in FIG. 17B, in which the red line is the one side of the field boundary, see the image shown in FIG. 17A, and is the initial reference wayline and the blue lines are the generated waylines that were generated based on parameters of the initial wayline such as provided by steps 904 and 1204 in methods 900 and 1200 respectively.

In some embodiments, C$^1$-continuous and C$^2$-continuous paths, or only C$^2$-continuous paths, are used in the interpolation described herein. A path is C$^1$-continuous if its derivative exists and is continuous. Paths that are only C1-continuous have discontinuities in their curvature. For example, a path composed of Dubins or Reeds-Shepp path segments has discontinuities in curvature at the points where the segments join. These discontinuities in C1-countiuous path result in changes in direction that may not be smooth enough for driving with passengers. Thus, a C$^2$-continuous is added in such embodiments, if its second derivative exists and is continuous. C2-continuous paths have continuous curvature and are smooth enough for driving with passengers.

FIG. 18 illustrates an example graphical output having a slider bar for adjusting the parameters of the waylines according to tradeoffs and the output can be a part of a graphical user interface (GUI)—such as a GUI provided by the computing system 200. The generation of waylines for a set of waylines can be alternatively based on a preference of an operator and the alternative generation of the waylines is selectable by the operator from a user interface (UI), such as a GUI. In some embodiments, the UI includes a slider for adjusting the parameters of the waylines according to one or more tradeoffs. For example, a slider is provided in the UI and is movable by a user to control the weights of an objective function (e.g., to adjust w1,w2, and w3 of the objection function described herein). If the operator cares less about one parameter of the set of waylines than another parameter, a lower value can be applied to corresponding one or more weights of the objective function via the slider (e.g., if the operator cares less about skipped area size than wayline length, then a lower value can be given to w3; which coincides with minimization of skipped area being a lower priority than wayline length in the objective functions). In some embodiments, the UI allows for multiple different selection choices for adjusting the objective function to adjust for different tradeoffs (e.g., adjust for less overlap or skipped area, or straightness of waylines versus skipped area, or less overlap versus straightness of waylines, etc.).

As shown in FIG. 19, method 1900 begins with step 1902, which includes using computing device(s) on a mobile machine (e.g., see mobile machine 110 depicted in FIG. 1) to input travelled path information (e.g., see recorded path information 118) and real-time field attributes (e.g., the field information 114 can include real-time recorded information) into a trained model (such as the trained model of method 300 or 400) and to receive new machine travel paths from the trained model (e.g., see new travel paths 120). At step 1904, the method 1900 continues with using, by the computing system (e.g., see computing system 102 or 200), the trained model to generate the new machine travel paths according to the travelled path information and the real-time field attributes. At step 1906, the method 1900 continues with using the computing device(s) on the mobile machine to control the machine to follow the new machine travel paths generated by the trained model. The real-time field attributes are sensed by sensors on the mobile machine, or by nearby sensors in the field, or by remote sensors capturing field attributes near the machine.

As shown in FIG. 20, method 2000 begins with step 2002, which includes using computing device(s) on a mobile machine (e.g., see mobile machine 110 depicted in FIG. 1) to input travelled path information (e.g., see recorded path information 118) and real-time mobile machine attributes (e.g., the machine information 112 can include real-time recorded information) into a trained model (such as the trained model of method 300 or 400) and to receive new machine travel paths from the trained model (e.g., see new travel paths 120). At step 2004, the method 2000 continues with using, by the computing system (e.g., see computing system 102 or 200), the trained model to generate the new machine travel paths according to the travelled path information and the real-time mobile machine attributes. At step

2006, the method 2000 continues with using the computing device(s) on the mobile machine to control the machine to follow the new machine travel paths generated by the trained model. The real-time field attributes are sensed by sensors on the mobile machine, or by nearby sensors in the field, or by remote sensors capturing mobile machine.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. The present disclosure can refer to the action and processes of a computing system, or similar electronic computing device, which manipulates and transforms data represented as physical (electronic) quantities within the computing system's registers and memories into other data similarly represented as physical quantities within the computing system memories or registers or other such information storage systems.

While the invention has been described in conjunction with the specific embodiments described herein, it is evident that many alternatives, combinations, modifications and variations are apparent to those skilled in the art. Accordingly, the example embodiments of the invention, as set forth herein are intended to be illustrative only, and not in a limiting sense. Various changes can be made without departing from the spirit and scope of the invention.

What is claimed is:

1. A method, comprising:
using a mobile machine to perform work in a field and recording travelled path information, the travelled path information comprising information about one or more paths followed by the mobile machine when performing the work in the field;
using one or more computing devices on the mobile machine to input the travelled path information into a trained deep learning model and to receive new machine travel paths from the deep learning model;
using the one or more computing devices on the mobile machine to control the machine to follow the new machine travel paths generated by the trained deep learning model;
using one or more computing devices on the mobile machine to input the travelled path information and real-time field attributes into the trained model and to receive new machine travel paths from the trained model, wherein the real-time field attributes are sensed by the mobile machine, or by nearby sensors in the field, or by remote sensors capturing field attributes near the machine; and using, by the computing system, the trained model to generate the new machine travel paths according to the travelled path information and the real-time field attributes.

2. The method of claim 1, further comprising:
receiving, by a computing system, initial routing information, the initial routing information defining routes followed or to be followed by one or more mobile machines in one or more fields; and
prior to using the deep learning model to generate new routing information, training, by the computing system, the deep learning model using the initial routing information.

3. The method of claim 2, wherein the initial routing information comprises initial waylines and the new machine travel paths comprise new waylines, wherein the new waylines do not include any of the initial waylines since the initial way lines have already been followed by the machine and none of the initial waylines need to be repeated to complete the route.

4. The method of claim 1, further comprising using, by the computing system, the trained model to generate new routing information specific to the field and the mobile machine, and wherein the use of the mobile machine to perform the work is based on the new routing information and the new routing information comprises the new machine travel paths.

5. The method of claim 1, further comprising storing the trained model on the mobile machine.

6. The method of claim 1, further comprising: receiving, by the computing system, initial mobile machine information pertaining to the mobile machine; and further training, by the computing system, the deep learning model according to the initial mobile machine information.

7. The method of claim 6, wherein the initial mobile machine information comprises one or more of machine model information, machine type information, machine size information, machine shape information, machine ground footprint information, machine turn radius information, and energy usage information.

8. The method of claim 1, further comprising: receiving, by the computing system, initial field information pertaining to the field; and further training, by the computing system, the deep learning model according to the initial field information.

9. The method of claim 8, wherein the initial field information comprises one or more of field size information, field shape information, field elevation information, field topology information, soil type information, soil condition information, crop type information, crop lodging information, soil compaction information, weed density information, and weed location information.

10. The method of claim 1, further comprising: receiving, by the computing system, weather data; and further training, by the computing system, the deep learning model according to the weather data.

11. The method of claim 1, wherein the trained model is configured to generate the new machine travel paths to minimize fuel consumption of the mobile machine when performing a given field operation.

12. The method of claim 1, wherein the trained model is configured to generate the new machine travel paths to minimize operation time of the mobile machine when performing a given field operation.

13. The method of claim 1, wherein the trained model is configured to generate the new machine travel paths to minimize soil compaction caused by the mobile machine when performing a given field operation.

14. A system, comprising: a processing device; and memory in communication with the processing device and storing instructions that, when executed by the processing device, cause the processing device to:

use a mobile machine to perform work in a field and recording travelled path information, the travelled path information comprising information about one or more paths followed by the mobile machine when performing the work in the field;

use one or more computing devices on the mobile machine to input the travelled path information into a trained deep learning model and to receive new machine travel paths from the deep learning model;

use the one or more computing devices on the mobile machine to control the machine to follow the new machine travel paths generated by the trained deep learning model;

use one or more computing devices on the mobile machine to input the travelled path information and real-time machine attributes into the trained model and to receive new machine travel paths from the trained model, wherein the real-time machine attributes are measured or sensed by the mobile machine, or by nearby sensors in the field, or by remote sensors capturing attributes of the machine; and use the trained model to generate the new machine travel paths according to the travelled path information and the real-time machine attributes.

15. The system of claim 14, wherein when the instructions are executed by the processing device, cause the processing device to:

receive initial routing information, the initial routing information defining routes followed or to be followed by one or more mobile machines in one or more fields;

prior to using the deep learning model to generate new routing information, train the deep learning model using the initial routing information; and store the trained model on the mobile machine.

16. The system of claim 14, wherein when the instructions are executed by the processing device, cause the processing device to:

use one or more computing devices on the mobile machine to input the travelled path information and real-time field attributes into the trained model and to receive new machine travel paths from the trained model, wherein the real-time field attributes are sensed by the mobile machine, or by nearby sensors in the field, or by remote sensors capturing field attributes near the machine; and use the trained model to generate the new machine travel paths according to the travelled path information and the real-time field attributes.

17. The system of claim 14, wherein when the instructions are executed by the processing device, cause the processing device to:

use one or more computing devices on the mobile machine to input the travelled path information and real-time machine attributes into the trained model and to receive new machine travel paths from the trained model, wherein the real-time machine attributes are measure or sensed by the mobile machine, or by nearby sensors in the field, or by remote sensors capturing attributes of the machine; and use the trained model to generate the new machine travel paths according to the travelled path information and the real-time machine attributes.

18. A method, comprising:

using a mobile machine to perform work in a field and recording travelled path information, the travelled path information comprising information about one or more paths followed by the mobile machine when performing the work in the field;

using one or more computing devices on the mobile machine to input the travelled path information into a trained deep learning model and to receive new machine travel paths from the deep learning model;

using the one or more computing devices on the mobile machine to control the machine to follow the new machine travel paths generated by the trained deep learning model;

using one or more computing devices on the mobile machine to input the travelled path information and real-time machine attributes into the trained model and to receive new machine travel paths from the trained model, wherein the real-time machine attributes are measured or sensed by the mobile machine, or by nearby sensors in the field, or by remote sensors capturing attributes of the machine; and using, by the computing system, the trained model to generate the new machine travel paths according to the travelled path information and the real-time machine attributes.

* * * * *